Figures 1, 2:
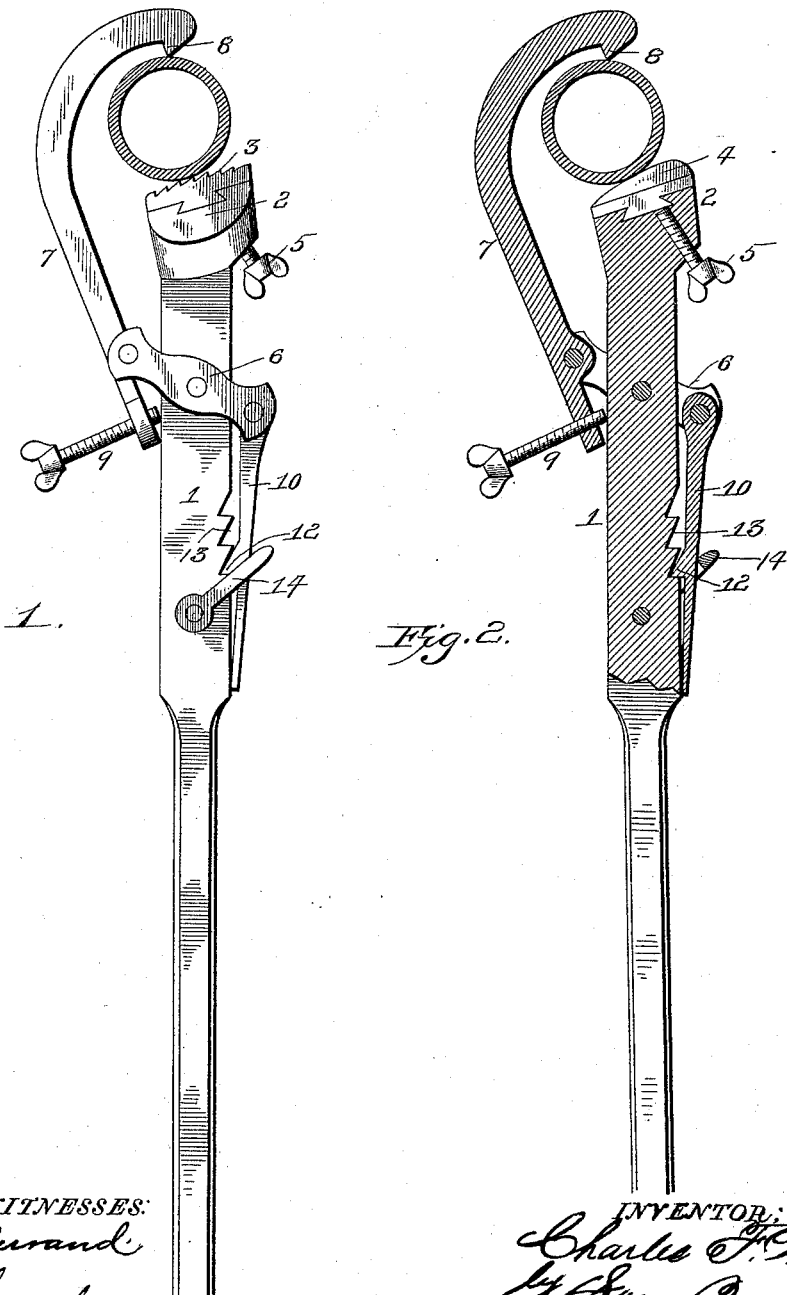

(No Model.)

C. F. WEST.
PIPE WRENCH.

No. 448,619. Patented Mar. 17, 1891.

WITNESSES:

INVENTOR:
Charles F. West,

UNITED STATES PATENT OFFICE.

CHARLES FREEMONT WEST, OF ALVORDTON, ASSIGNOR OF ONE-HALF TO LEWIS E. CONNELL, OF PIONEER, OHIO.

PIPE-WRENCH.

SPECIFICATION forming part of Letters Patent No. 448,619, dated March 17, 1891.

Application filed September 1, 1890. Serial No. 363,678. (No model.)

*To all whom it may concern:*

Be it known that I, CHARLES FREEMONT WEST, a citizen of the United States, and a resident of Alvordton, in the county of Williams and State of Ohio, have invented certain new and useful Improvements in Gas-Pipe Wrenches; and I do hereby declare that the following is a full, clear, and exact description of the invention, which will enable others skilled in the art to which it appertains to make and use the same, reference being had to the accompanying drawings, which form a part of this specification.

My invention relates to improvements in pipe wrenches and cutters, the object being to provide a simple, economical, and efficient implement for the above purpose which can readily be adjusted to fit pipes of different diameters.

The invention is more particularly designed for use by plumbers and gas-fitters, and is provided with interchangeable grips or jaws, so that it may be readily transformed into a pipe cutter or wrench, as may be desired. It can also be adjusted with great ease and rapidity, whereby a very efficient device is produced.

The invention consists in the novel construction and combination of parts, hereinafter fully described, and specifically defined in the claims.

In the accompanying drawings, Figure 1 represents a side elevation of a pipe-wrench constructed in accordance with my invention. Fig. 2 is a sectional view of the implement when employed as a cutter.

In said drawings, the reference-numeral 1 designates the shank of the implement, formed or provided at its upper end with a jaw 2, having the serrations or teeth 3, so as to enable a firm hold to be had upon the pipe. In Fig. 2 this jaw is shown to be replaced by a circular cutter 4, which is connected with the shank by a tongue-and-groove connection and secured in place by a set-screw 5. Near the upper end of the shank is pivoted an oscillating block 6, which projects from each side thereof. To one end of this block is pivoted the arm 7, bent over at its outer end into a hook 8, which embraces the pipe and forms the movable jaw of the device. The other end of this arm is provided with an aperture through which passes a set-screw 9, the end of which bears against the shank and by which the movable jaw may be adjusted. The other end of the block 6 has pivoted to it an arm 10, which is provided intermediate of its ends with a shoulder 12, which engages with the teeth 13 on the shank. The numeral 14 designates a bail embracing the shank and pivoted thereto. The free end of the arm 10 rests between the lower end of this bail and the shank in such a manner that by turning the bail on its pivot the shoulder 12 of said arm will engage with and be securely held by the teeth 13.

The operation will readily be understood. The movable jaw can readily be adjusted to fit the pipe by means of the arm 10, which will actuate the block 6, which in turn will operate the movable arm carrying the movable jaw. When properly adjusted, the teeth 13 will engage with the shoulder 12 of arm 10, and the bail being turned they are securely held in engagement and no movement of the arm 10 permitted. To more accurately adjust the device to the pipe and to also compensate for the action of the cutter when the device is used for cutting pipe, I provide the set-screw 9. By operating this screw the movable jaw can be actuated and adjusted with relation to the stationary jaw and the pipe securely held.

Having thus described my invention, what I claim is—

1. In a pipe wrench or cutter, the combination, with the shank having a stationary jaw or cutter, a series of teeth, and an oscillating block pivoted thereto, of the arm carrying the movable jaw pivoted to one end of said block, and an arm pivoted to the other end of said block, having a shoulder engaging with the teeth on the shank, substantially as described.

2. In a pipe wrench or cutter, the combination, with the shank 1, having a stationary jaw or cutter, teeth 13, and pivoted block 6, of the arm 7, pivoted to said block, having jaw 8 and set-screw 9, the arm 10, provided with shoulders 12, and the bail 14, pivoted to the shank, substantially as described.

In testimony that I claim the foregoing as my own I have hereunto affixed my signature in presence of two witnesses.

CHARLES FREEMONT WEST.

Witnesses:
GEORGE WEBBER,
J. A. FLORA.